United States Patent Office 2,989,425
Patented June 20, 1961

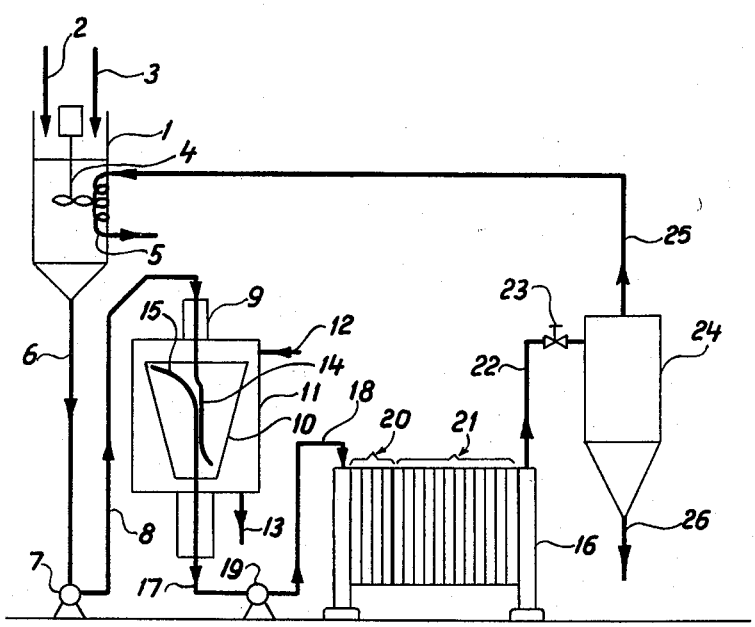

2,989,425
METHOD FOR HYDROLYSIS OF STARCH
Svante Bierke, Lidingo, Sweden, and Mihajlo Mautner, Zagreb, Yugoslavia, assignors to Aktiebolaget Separator, Stockholm, Sweden, a corporation of Sweden
Filed Nov. 18, 1958, Ser. No. 774,778
Claims priority, application Sweden Oct. 30, 1957
5 Claims. (Cl. 127—38)

The present invention relates to a method for hydrolysis of starch in an acid water suspension while heating. In this process, the starch which may be symbolized as $(C_6H_{10}O_5)_n$, where $n$ can be 5,000 to 20,000, is hydrolyzed, via dextrins and polysaccharides, down to maltose $(C_{12}H_{22}O_{11})$ and glucose $(C_6H_{12}O_6)$. The latter can be polymerized, by continued treatment, to polysaccharides. One of the problems which the present invention is intended to solve, is how to get a definite hydrolysis product (for example, crystallizable glucose) with the greatest possible yield or purity, that is, a glucose containing a minimum of hydrolysis products lying between starch and glucose.

There are two methods of hydrolysis of starch which have come into commercial use. One is characterized in that a starch suspension, to which acid has been added, is instantly brought to a temperature of 100° C. by direct admission of steam. In this way, the gelatinization temperature is passed so rapidly that the starch grains, without being gelatinized, are transformed into soluble starch. This is then further hydrolyzed while passing through an externally heated pipe forming a holding zone for completing the hydrolysis. The steam is added through an injector nozzle and forces the starch suspension further on through the pipe. The great velocities of flow occurring here produce, in conjunction with the acid in the starch suspension, a strong erosion in the nozzle so that this is rapidly worn and has to be replaced very often. Furthermore, the plant functions badly when treating suspensions with a high starch concentration, since a starch solution of high viscosity is then formed which will pass through the pipe only with difficulty. The method is thus suitable only for starch suspension of low concentration (12 to 15° Bé. Also, impurities in the supplied steam, such as oil from other sections of the plant, will easily get into the starch suspension. Finally, it is difficult to get a final product with a definite, desired degree of hydrolysis, but in practice a final product is obtained which is a mixture of hydrolysis products having considerably different degrees of hydrolysis. This is to be attributed to the fact that under the laminar conditions of flow prevailing in the pipe, all the starch grains have not had the same possibility of coming into contact with the hot inside of the pipe and have, consequently, been subjected, in a different degree, to the action of hydrolysis.

With the second method, a starch suspension, to which acid has been added, is forced by a pump under high hydraulic pressure (50 to 60 atm.) through a heater consisting of a longitudinally extended channel with annular cross section formed by three tubes concentric with one another. Through the innermost tube, as also through the interspace between the middle tube and the outermost one, steam passes, thus heating both from within and from without the interspace formed by the innermost tube and the middle one. Through the last-mentioned interspace the starch suspension is led, thus being heated indirectly by steam and thereby transferred into soluble form. Here, too, the hydrolysis is completed in a special pipe. The heater is made of copper since it would be too expensive to make it of stainless steel. The copper, however, renders the final product impure. In case of disturbances of operation, the heater will easily get filled with gelatinized starch and cannot then be cleaned, as it is impossible to remove it. The variations in the final product will be still greater than with the previous method. Moreover, the plant requires large space and is difficult to manage.

The principal object of the present invention is to eliminate the aforementioned difficulties. Briefly, this is done by bringing the acid starch suspension to flow through a rotating chamber whose wall is heated on the outside. It is advantageous to carry out the method continuously.

As the starch suspension enters the rotating chamber, it is forced by the centrifugal force towards the inside of the wall. The starch grains having the greatest specific gravity are forced against the heated wall and are rapidly hydrolyzed by the temperature rise to which they are subjected at the contact with the wall. Then they absorb water, swell, get reduced specific gravity and are forced away from the wall by newly supplied, nonhydrolyzed starch grains. In this way, it is ensured that all the starch grains have the same possibility of being hydrolyzed and that, simultaneously, the wall is kept clean. Also, the heat transfer to the starch suspension will be uniform, and efficient as well.

To be further hydrolyzed, the starch suspension, after leaving the rotating chamber, is heated in a closed chamber to over 100° C. and is kept heated there during the time required for completing the hydrolysis to the desired degree.

According to a particularly suitable embodiment of the invention, the suspension is brought to flow as a very thin film along a wall inclined towards the axis of rotation, and is discharged from the rotating chamber at a greater diameter than where it is introduced. Expressing it more exactly, the rotating chamber is formed by a rotor with a conical wall, and the discharge preferably takes place by means of a paring member. The subsequent heating to over 100° C. is carried out advantageously in a plate heat exchanger from which products with different degree of hydrolysis can, if desired, be taken out at different points of the path of flow through it. The heating to over 100° C. can, however, also take place in a closed rotating chamber.

The advantages of the new method are that the hydrolysis can now be carried out under conditions having less effect on the material of the apparatus, inasmuch as it is possible to operate with a shorter reaction time, a lower temperature and a higher pH-value (1.7 as against, previously, 1.1 to 1.3). As material for the apparatus, stainless steel can be used or even copper, since the contamination of the final product with copper will be considerably less due to the considerably less aggravating conditions. In addition, it is possible to operate with starch suspensions of high concentration, e.g. 22° Bé. Also, the above-mentioned variations in the final product will be small owing to the uniform conditions of reaction to which each individual starch grain is subjected. Thus, the final product will be a crystallizable glucose of great purity. Finally, the plant will be cheaper than those used previously, requires small space, and is easy to operate.

The invention is explained more in detail in the following, with reference to the attached drawing, showing diagrammatically and by way of example, a plant for carrying out the new method.

In the drawing, 1 denotes a container into which are lead a starch suspension of 22° Bé. and hydrochloric acid through pipes 2 and 3, respectively. The suspension is acidified by a suitable dosage of the acid to a pH-value of 1.7. In the container are arranged a motor-driven stirrer 4 and a pipe coil 5, which is heated by steam. The pipe coil, in its turn, heats the suspension to 40 to 50° C. From the bottom of the container, the starch suspension is discharged through a pipe 6 to a pump 7 which feeds the suspension through a pipe 8 into a heater 9. The latter is essentially an externally-heated hollow rotor 10 having conventional means (not shown) for mounting and driving it on a vertical axis, the rotor having an imperforate wall of frusto-conical shape tapering downward. The rotor is located in a housing 11 to which steam is supplied through a pipe 12, condensed water being discharged through an outlet 13. The condensed water is formed by the condensation of steam on the outside of the rotor 10. The suspension is led into the heater 9, at the narrow end of the rotor 10, by means of a stationary pipe 14, and is pared out from the wide end of the rotor by means of a stationary paring tube 15. The time during which the suspension remains in the rotor is ½ to 1 sec., and in that time the suspension is heated to 95° C. Because of the rapid heating to this temperature, the gelatinization temperature is also passed rapidly (the latter is between about 63 to 68° C. according to the type of starch). This avoids a detrimental formation of gelatinized starch which clogs apparatus and piping.

As will be seen from the drawing, the rotor is conical. Owing to the introduction and discharge shown, a thin film flowing rapidly from one end of the rotor to the other, is formed. In producing, for example, crystallizable glucose, the starch solution is treated further in a plate heat exchanger 16 into which it is fed by a pump 19 through pipes 17 and 18. In the section 20 of the plate heat exchanger, the starch solution is brought to a temperature of 130 to 150° C. and is maintained at this temperature in the other and larger section 21 of the plate heat exchanger. In the latter section, where the holding time is 2 to 15 minutes according to the product desired, a hydraulic pressure is maintained, for example, of ½ atm. above the prevailing steam pressure, to prevent steam generation. The solution leaves the heat exchanger 16 through a pipe 22 having a pressure reducing valve 23 and passes to an expansion vessel 24 where, due to the pressure drop, steam is boiled off. The steam boiled off can be fed via a pipe 25 to the pipe coil 5, to be used there for pre-heating the starch suspension. The ready hydrolyzed product is discharged through a pipe 26 and neutralized, as with a solution of sodium carbonate, which can be done continuously and automatically. The product is then passed further on for purification, evaporation and crystallization.

The rotor 10 can be open or closed to the atmosphere, but is preferably closed to the steam chamber in housing 11.

In the manner described, it is possible to produce, for example, glucose of 96% which, beyond the glucose, contains 3% of other reductive sugar and 1% of dextrins, gentiobiose, etc., or a starch syrup containing, for example, 38% of reductive sugar (13% of glucose and 25% of maltose) and 62% of dextrins and non-reductive polysaccharides.

We claim:

1. In the hydrolysis of starch in an acid water suspension, the method which comprises flowing the suspension through a rotating chamber while maintaining the suspension in the form of a film under the action of centrifugal force in the rotating chamber, and simultaneously applying heat to said film of starch in said chamber by way of the outer wall of the chamber.

2. A method according to claim 1, in which the hydrolysis is carried out continuously.

3. A method according to claim 1, in which the starch suspension, after leaving the rotating chamber, is heated in a closed chamber to over 100° C.

4. A method according to claim 1, in which the starch suspension, after leaving the rotating chamber, is maintained heated for a period sufficient to complete the hydrolysis.

5. A method according to claim 1, in which the suspension is flowed along a part of said wall inclined towards the axis of rotation and is discharged from the rotating chamber at a greater radius than the radius at which it is introduced into the chamber.

References Cited in the file of this patent

UNITED STATES PATENTS

| 1,928,891 | Hagen | Oct. 3, 1933 |
| 2,481,436 | Miller | Sept. 6, 1949 |
| 2,735,792 | Kroyer | Feb. 21, 1956 |
| 2,783,167 | Lineberry | Feb. 26, 1957 |